United States Patent
Akiyoshi et al.

(10) Patent No.: US 10,787,161 B2
(45) Date of Patent: Sep. 29, 2020

(54) CONTROL DEVICE OF CONTINUOUSLY VARIABLE TRANSMISSION, CONTROL METHOD THEREOF, AND CONTINUOUSLY VARIABLE TRANSMISSION AND VEHICLE USING THE SAME

(71) Applicant: Honda Motor Co., Ltd., Tokyo (JP)

(72) Inventors: Norihiro Akiyoshi, Saitama (JP); Kohei Sakai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/373,593

(22) Filed: Apr. 2, 2019

(65) Prior Publication Data

US 2019/0308605 A1    Oct. 10, 2019

(30) Foreign Application Priority Data

Apr. 5, 2018 (JP) ................. 2018-073127

(51) Int. Cl.
| | | |
|---|---|---|
| B60W 10/101 | (2012.01) | |
| F16H 61/662 | (2006.01) | |
| B60K 6/387 | (2007.10) | |
| F16H 9/12 | (2006.01) | |
| B60W 10/18 | (2012.01) | |

(52) U.S. Cl.
CPC .......... B60W 10/101 (2013.01); B60K 6/387 (2013.01); B60W 10/182 (2013.01); F16H 9/12 (2013.01); F16H 61/66236 (2013.01)

(58) Field of Classification Search
None
See application file for complete search history.

(56) References Cited

U.S. PATENT DOCUMENTS

| | | | | |
|---|---|---|---|---|
| 6,736,753 B2 * | 5/2004 | Endo | ........................ | B60K 6/44 477/3 |
| 6,881,165 B2 * | 4/2005 | Endo | ........................ | B60K 6/48 417/350 |
| 8,958,960 B2 * | 2/2015 | Wakayama | ......... | F16H 61/0031 701/54 |

(Continued)

FOREIGN PATENT DOCUMENTS

| | | |
|---|---|---|
| CN | 105452630 | 3/2016 |
| JP | 2010242863 | 10/2010 |

(Continued)

OTHER PUBLICATIONS

"Office Action of Japan Counterpart Application," with English translation thereof, dated Aug. 13, 2019, pp. 1-6.

(Continued)

*Primary Examiner* — Dirk Wright
(74) *Attorney, Agent, or Firm* — JCIPRNET

(57) ABSTRACT

Provided are a control device and a control method of a continuously variable transmission capable of preventing an endless member from slipping even when a parking lock is released. On a condition that a vehicle is in an idling stop state and a parking lock mechanism is in a parking lock state, rotation speed increase control configured to increase a rotation speed of an electric oil pump is executed so that the endless member can be prevented from slipping with respect to a driven pulley even when the parking lock mechanism is switched to a parking lock released state.

20 Claims, 2 Drawing Sheets

(56) References Cited

U.S. PATENT DOCUMENTS 9,097,315 B2 * 8/2015 Aoyama .................. F16H 9/16
9,353,857 B2 * 5/2016 Waku ..................... F16H 61/702
9,643,577 B2 * 5/2017 Waku ...................... B60T 17/22

FOREIGN PATENT DOCUMENTS

| WO | 2012111096 | 8/2012 |
| WO | 2013128753 | 9/2013 |

OTHER PUBLICATIONS

"Office Action of China Counterpart Application", dated Jun. 1, 2020, with English translation thereof, p. 1-p. 16.

* cited by examiner

CONTROL DEVICE OF CONTINUOUSLY VARIABLE TRANSMISSION, CONTROL METHOD THEREOF, AND CONTINUOUSLY VARIABLE TRANSMISSION AND VEHICLE USING THE SAME

CROSS-REFERENCE TO RELATED APPLICATION

This application claims the priority of Japan patent application serial no. 2018-073127, filed on Apr. 5, 2018. The entirety of the above-mentioned patent application is hereby incorporated by reference herein and made a part of this specification.

BACKGROUND

Technical Field

The disclosure relates to a control device of a continuously variable transmission, a control method thereof, and a continuously variable transmission and a vehicle using the same.

Description of Related Art

Conventionally, a belt-type continuously variable transmission including a control device for controlling a transmission gear ratio is known (for example, see Patent Document 1).

In a continuously variable transmission disclosed in Patent Document 1, a parking gear is provided on a rear surface side of a fixed pulley. In a P range, a parking pawl is fitted to the parking gear, and a parking lock state is established to prevent unintended rotation of drive wheels.

PATENT DOCUMENTS

[Patent Document 1] Japanese Laid-open No. 2010-242863

In recent years, the number of vehicles that perform idling stops is increasing even in a P range for reasons such as improvement in fuel efficiency. During the idling stop, a minimum hydraulic pressure is supplied to necessary portions of a continuously variable transmission by an electric oil pump.

Here, while a vehicle is stopped on an inclined road, when a driver releases his/her foot from a brake pedal while a P range is maintained, a rotating shaft of the continuously variable transmission is fixed in a state in which a parking lock mechanism is parking locked. However, on an inclined road, since a force acting to rotate is applied to drive wheels due to a weight of the vehicle, a torsion phenomenon of a rotating shaft occurs in a power transmission path from the drive wheels to the parking gear. In this state, when a driver performs an operation for switching from the P range to another range, since the rotating shaft that has been in a torsion state twists with a self-restoring force and tries to eliminate the torsion phenomenon at the time when the parking lock is released, a driven pulley also rotates together.

At this time, since only a necessary minimum of hydraulic pressure was supplied by the electric oil pump during the idling stop, it was found from experimental results that a hydraulic pressure (lateral pressure) supplied to a drive pulley and a driven pulley was low, causing slipping of an endless member, such as a metal belt, to occur on the drive pulley and the driven pulley.

SUMMARY

One or some exemplary embodiments of the disclosure provide a control device (for example, a control device 34 of an embodiment. The same applies below.) of a continuously variable transmission (for example, a continuously variable transmission 1 of the embodiment. The same applies below.) including a drive pulley (for example, a drive pulley 11 of the embodiment. The same applies below.), a driven pulley (for example, a driven pulley 12 of the embodiment. The same applies below.), an endless member (for example, an endless member 13 of the embodiment. The same applies below.) wound around the drive pulley and the driven pulley, a parking lock mechanism (for example, a parking lock mechanism 40 of the embodiment. The same applies below.) including a parking gear (for example, a parking gear 41 of the embodiment. The same applies below.) integrally rotating with the driven pulley and configured to be switchable between a parking lock state in which rotation of the parking gear is stopped and a parking lock released state in which the parking gear is rotatable, and an electric oil pump (for example, an electric oil pump of the embodiment. The same applies below.) which is able to supply a hydraulic pressure to the drive pulley and the driven pulley, in which, on a condition that a vehicle is in an idling stop state and the parking lock mechanism is in the parking lock state, even when the parking lock mechanism is switched to the parking lock released state, rotation speed increase control (for example, rotation speed increase control of the embodiment. The same applies below.) configured to increase a rotation speed of the electric oil pump is executed to be able to prevent the endless member from slipping with respect to the driven pulley.

Further, one or some exemplary embodiments of the disclosure can be configured as a continuously variable transmission including a control device, the drive pulley, the driven pulley, the endless member, the parking lock mechanism, and the electric oil pump.

Further, one or some exemplary embodiments of the disclosure can be configured as a vehicle including a continuously variable transmission, a motor which outputs a driving force to the continuously variable transmission (for example, an internal-combustion engine 2 of the embodiment. The same applies below.), an inclination detection unit which transmits information to the control device, and a drive wheel rotated by a driving force output from the continuously variable transmission.

Further, one or some exemplary embodiments of the disclosure provide a control method of a continuously variable transmission including a drive pulley, a driven pulley, an endless member wound around the drive pulley and the driven pulley, a parking lock mechanism including a parking gear integrally rotating with the driven pulley and configured to be switchable between a parking lock state in which rotation of the parking gear is stopped and a parking lock released state in which the parking gear is rotatable, and an electric oil pump which is able to supply hydraulic pressure to the drive pulley and the driven pulley, in which, on the condition that a vehicle is in an idling stop state and the parking lock mechanism is in the parking lock state, even when the parking lock mechanism is switched to the parking lock released state, rotation speed increase control configured to increase a rotation speed of the electric oil pump is executed to be able to prevent the endless member from slipping with respect to the driven pulley.

DESCRIPTION OF THE EMBODIMENTS

Figure 1:
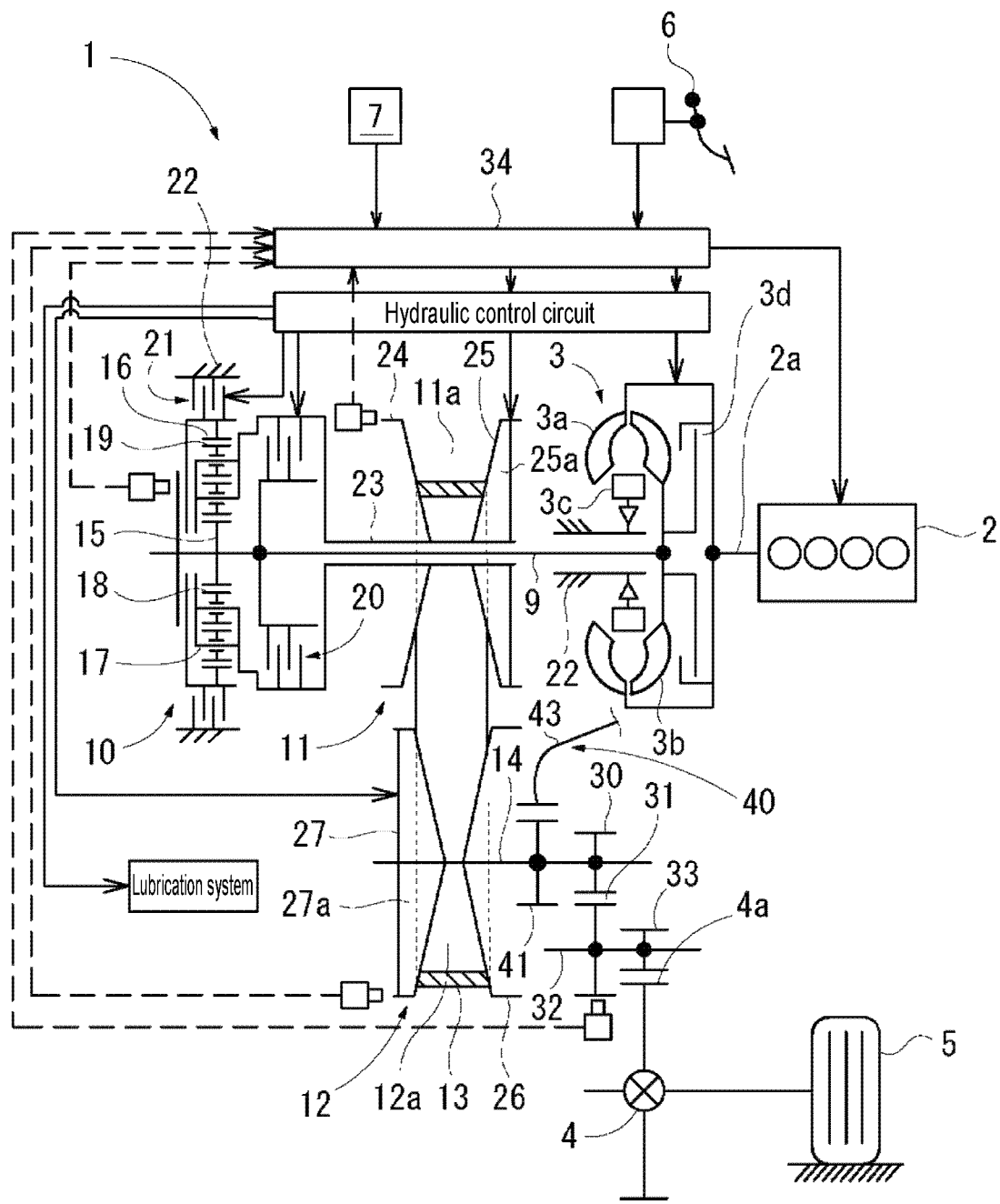
FIG. 1 is an explanatory view schematically illustrating a vehicle including a control device of an embodiment of the disclosure.

The embodiments of the disclosure provide a control device of a continuously variable transmission capable of preventing an endless member from slipping even when a parking lock is released and a control method thereof.

[1] One or some exemplary embodiments of the disclosure provide a control device (for example, a control device 34 of an embodiment. The same applies below.) of a continuously variable transmission (for example, a continuously variable transmission 1 of the embodiment. The same applies below.) including a drive pulley (for example, a drive pulley 11 of the embodiment. The same applies below.), a driven pulley (for example, a driven pulley 12 of the embodiment. The same applies below.), an endless member (for example, an endless member 13 of the embodiment. The same applies below.) wound around the drive pulley and the driven pulley, a parking lock mechanism (for example, a parking lock mechanism 40 of the embodiment. The same applies below.) including a parking gear (for example, a parking gear 41 of the embodiment. The same applies below.) integrally rotating with the driven pulley and configured to be switchable between a parking lock state in which rotation of the parking gear is stopped and a parking lock released state in which the parking gear is rotatable, and an electric oil pump (for example, an electric oil pump of the embodiment. The same applies below.) which is able to supply a hydraulic pressure to the drive pulley and the driven pulley, in which, on a condition that a vehicle is in an idling stop state and the parking lock mechanism is in the parking lock state, even when the parking lock mechanism is switched to the parking lock released state, rotation speed increase control (for example, rotation speed increase control of the embodiment. The same applies below.) configured to increase a rotation speed of the electric oil pump is executed to be able to prevent the endless member from slipping with respect to the driven pulley.

According to one or some exemplary embodiments of the disclosure, the rotation speed increase control is executed on the condition that the vehicle is in the idling stop state and the parking lock mechanism is in the parking lock state. Therefore, even when the parking lock mechanism is switched to the parking lock released state, the endless member is securely held by a lateral pressure of the drive pulley and the driven pulley, and thereby slipping of the endless member on the drive pulley and the driven pulley can be prevented.

[2] Further, in one or some exemplary embodiments of the disclosure, the control device of a continuously variable transmission may be able to receive or calculate inclination information from an inclination detection unit (for example, an acceleration sensor 7 of the embodiment. The same applies below.) and increase an increment of the rotation speed of the electric oil pump as an inclination angle of the obtained inclination information becomes larger. The larger an inclination of a place at which a vehicle is stopped, the more a torsion amount of a shaft increases, and a hydraulic pressure required to prevent the endless member from slipping when the parking lock mechanism is switched to the parking lock released state also increases. Therefore, when an increment of the rotation speed of the electric oil pump is set to correspond to the inclination angle, it is possible to appropriately prevent slipping of the endless member accompanying release of the shaft torsion while minimizing wasteful consumption of electric energy.

[3] Further, in one or some exemplary embodiments of the disclosure, the control device of a continuously variable transmission may be able to receive or calculate inclination information from the inclination detection unit and execute the rotation speed increase control when an inclination of the obtained inclination information is equal to or larger than a predetermined inclination.

Further, regardless of the inclination, when the rotation speed increase control is executed on the condition that the vehicle is in the idling stop state and the parking lock mechanism is in the parking lock state, a configuration of control processing can be simplified, but electric energy is wastefully consumed when the rotation speed increase control is executed under the condition that the shaft torsion does not occur.

Therefore, as described above, if the rotation speed increase control is executed when an inclination is equal to or larger than the predetermined inclination and if the rotation speed increase control is not executed when an inclination is less than the predetermined inclination, wasteful consumption of electric energy when an inclination may not cause shaft torsion can be minimized. Further, the "predetermined inclination" is appropriately set as an inclination at which shaft torsion may occur to such an extent that slipping of the endless member may occur according to a weight of the vehicle or the like.

[4] Further, in one or some exemplary embodiments of the disclosure, the control device of a continuously variable transmission may be able to receive presence/absence information of a braking operation of the vehicle, execute the rotation speed increase control on a condition that the braking operation of the vehicle is not being performed, and stop execution of the rotation speed increase control when the braking operation of the vehicle is being performed.

When a braking operation of the vehicle is being performed, since drive wheels do not rotate, shaft torsion does not occur.

Therefore, as described above, when the rotation speed increase control is executed on the condition that the braking operation of the vehicle is not being performed and if execution of the rotation speed increase control is stopped when the braking operation of the vehicle is being performed, wasteful consumption of electric energy by the electric oil pump when the braking operation in which shaft torsion may not occur is performed can be minimized.

[5] Further, one or some exemplary embodiments of the disclosure can be configured as a continuously variable transmission including a control device, the drive pulley, the driven pulley, the endless member, the parking lock mechanism, and the electric oil pump.

According to one or some exemplary embodiments of the disclosure, the rotation speed increase control is executed on a condition that a vehicle is in an idling stop state and the parking lock mechanism is in the parking lock state. Therefore, even when the parking lock mechanism is switched to the parking lock released state, the endless member is securely held by a lateral pressure of the drive pulley and the driven pulley, and thereby slipping of the endless member on the drive pulley and the driven pulley can be prevented.

[6] Further, one or some exemplary embodiments of the disclosure can be configured as a vehicle including a continuously variable transmission, a motor which outputs a driving force to the continuously variable transmission (for example, an internal-combustion engine 2 of the embodiment. The same applies below.), an inclination detection unit which transmits information to the control device, and a drive wheel rotated by a driving force output from the continuously variable transmission.

According to one or some exemplary embodiments of the disclosure, the rotation speed increase control is executed on the condition that a vehicle is in an idling stop state and the parking lock mechanism is in the parking lock state. Therefore, even when the parking lock mechanism is switched to the parking lock released state, the endless member is securely held by a lateral pressure of the drive pulley and the driven pulley, and thereby slipping of the endless member on the drive pulley and the driven pulley can be prevented.

[7] Further, one or some exemplary embodiments of the disclosure provide a control method of a continuously variable transmission including a drive pulley, a driven pulley, an endless member wound around the drive pulley and the driven pulley, a parking lock mechanism including a parking gear integrally rotating with the driven pulley and configured to be switchable between a parking lock state in which rotation of the parking gear is stopped and a parking lock released state in which the parking gear is rotatable, and an electric oil pump which is able to supply hydraulic pressure to the drive pulley and the driven pulley, in which, on the condition that a vehicle is in an idling stop state and the parking lock mechanism is in the parking lock state, even when the parking lock mechanism is switched to the parking lock released state, rotation speed increase control configured to increase a rotation speed of the electric oil pump is executed to be able to prevent the endless member from slipping with respect to the driven pulley.

According to the embodiments of the disclosure, the rotation speed increase control is executed on the condition that the vehicle is in an idling stop state and the parking lock mechanism is in the parking lock state. Therefore, even when the parking lock mechanism is switched to the parking lock released state, the endless member is securely held by a lateral pressure of the drive pulley and the driven pulley, and thereby slipping of the endless member on the drive pulley and the driven pulley can be prevented.

A control device of a continuously variable transmission of one or some exemplary embodiments of the disclosure will be described in detail with reference to the drawings. The continuously variable transmission of the present embodiment is a belt type continuously variable transmission and is mounted transversely on a front-engine front-drive (FF) type vehicle (automobile). Further, the continuously variable transmission, to which the control device of the embodiment of the disclosure is applied, is not limited to being mounted on FF type automobiles and can also be used for other vehicles to obtain effects of the embodiments of the disclosure. For example, the control device of the embodiment of the disclosure can also be applied to front-engine rear-drive (FR) type vehicles, mid-engine type vehicles, and motorcycles.

As illustrated in FIG. 1, a vehicle (automobile) on which a continuously variable transmission 1 of the present embodiment is mounted includes an internal-combustion engine 2 (engine) as an motor for traveling, a torque converter 3, a differential gear 4, and left and right drive wheels 5.

The internal-combustion engine 2 includes a throttle valve (not illustrated) disposed in an air intake passage. A throttle valve (not illustrated) is not mechanically connected to an accelerator pedal but is connected to the accelerator pedal by an electric signal via a drive-by-wire mechanism (not illustrated) having an actuator, such as an electric motor, and is opened and closed according to an operation of the accelerator pedal.

Air suctioned into the internal-combustion engine 2 is mixed with fuel injected from an injector (not illustrated) through an intake manifold after an inflow rate thereof is adjusted by the throttle valve (not illustrated) and becomes an air-fuel mixture. When an intake valve of a cylinder is opened, the air-fuel mixture flows into the cylinder. The air-fuel mixture in the cylinder is ignited by a spark plug and burned and thereby presses a piston. The pressed piston rotates a crankshaft 2a, and a burned air-fuel mixture is discharged from the internal-combustion engine 2 as an exhaust gas.

A driving force output from the crankshaft 2a of the internal-combustion engine 2 is transmitted to the differential gear 4 via the continuously variable transmission 1 and distributed to the left and right drive wheels 5.

The torque converter 3 includes a pump impeller 3a, a turbine runner 3b, and a stator 3c which are connected to the crankshaft 2a of the internal-combustion engine 2 and performs power transmission with a fluid (oil or hydraulic oil) interposed therebetween. Further, when a lock-up clutch 3d is provided in the torque converter 3 and the lock-up clutch 3d is caused to be engaged, it is also possible to directly transmit a driving force of the crankshaft 2a to the turbine runner 3b without intervention of a fluid (oil or hydraulic oil) interposed.

The continuously variable transmission 1 includes an input shaft 9, a forward/reverse switching mechanism 10 configured by a planetary gear mechanism, a drive pulley 11, a driven pulley 12, an endless member 13 made of a metal belt wound around the drive pulley 11 and the driven pulley 12, and an output shaft 14 disposed parallel to the input shaft 9.

The input shaft 9 is connected to the turbine runner 3b and receives a driving force of the internal-combustion engine 2 output from the crankshaft 2a via the torque converter 3. The drive pulley 11 is pivotally supported by the input shaft 9 to be relatively rotatable. The forward/reverse switching mechanism 10 is disposed so that the drive pulley 11 is sandwiched between the forward/reverse switching mechanism 10 and the torque converter 3.

The forward/reverse switching mechanism 10 is configured by a double pinion type planetary gear mechanism and includes a sun gear 15, a ring gear 16, a carrier 17, a first pinion 18, a second pinion 19, a forward clutch 20, and a reverse brake 21.

The sun gear 15 is fixed to a protruding portion of the input shaft 9 which protrudes through the drive pulley 11 toward a side opposite to the torque converter 3 side. The reverse brake 21 is provided in the ring gear 16, and the ring gear 16 can be fixed to a transmission case 22 when the reverse brake 21 is caused to be engaged. The first pinion 18 and the second pinion 19 are meshed with each other, the first pinion 18 is meshed with the sun gear 15, and the second pinion 19 is meshed with the ring gear 16.

The carrier 17 pivotally supports the first pinion 18 and the second pinion 19 to be rotatable and revolvable. In other words, the first pinion 18 and the second pinion 19 are rotatably supported by the carrier 17, and the carrier 17 is provided to be relatively rotatable with respect to the sun gear 15 and the ring gear 16 together with the first pinion 18 and the second pinion 19.

The forward clutch 20 is connected to the input shaft 9 and the carrier 17, and the sun gear 15 and the carrier 17 are configured to integrally rotate when the forward clutch 20 is caused to be engaged. The carrier 17 is connected to the drive pulley 11.

Both the forward clutch 20 and the reverse brake 21 are hydraulic frictional engagement mechanisms which are frictionally engaged by a hydraulic pressure. When the forward clutch 20 is engaged and the reverse brake 21 is released, rotation of the input shaft 9 is directly transmitted to the drive pulley 11 via the carrier 17, and the drive pulley 11 is rotated in a direction in which the vehicle (automobile) advances.

When the reverse brake 21 is engaged and the forward clutch 20 is released, the ring gear 16 is fixed to the transmission case 22, the carrier 17 rotates in a direction opposite to that of the sun gear 15, and thereby the drive pulley 11 rotates in a direction in which the vehicle (automobile) reverses. Further, when both the forward clutch 20 and the reverse brake 21 are released, the forward/reverse switching mechanism 10 can disconnect the power transmission between the drive pulley 11 and the input shaft 9.

In the continuously variable transmission 1, power transmission is performed via a frictional force between the drive pulley 11, the driven pulley 12, and the endless member 13. The drive pulley 11 includes a pulley shaft 23 connected to the carrier 17, a fixed drive half 24 fixed to the pulley shaft 23, and a movable drive half 25 rotating integrally with the pulley shaft 23 and movable in an axial direction of the pulley shaft 23.

The movable drive half 25 can be brought close to the fixed drive half 24 by supplying a hydraulic pressure to a hydraulic pressure chamber 25a and can be separated from the fixed drive half 24 by discharging oil from the hydraulic pressure chamber 25a. Thereby, it is possible to adjust a width of a V-shaped pulley groove 11a of the drive pulley 11 which is formed between facing surfaces of the fixed drive half 24 and the movable drive half 25 facing each other.

The driven pulley 12 includes a fixed driven half 26 fixed to the output shaft 14 and a movable driven half 27 rotating integrally with the output shaft 14 and movable in an axial direction of the output shaft 14. The movable driven half 27 can be brought close to the fixed driven half 26 by supplying a hydraulic pressure to a hydraulic pressure chamber 27a and can be separated from the fixed driven half 26 by discharging oil from the hydraulic pressure chamber 27a. Thereby, it is possible to adjust a width of a V-shaped pulley groove 12a of the driven pulley 12 which is formed between facing surfaces of the fixed driven half 26 and the movable driven half 27 facing each other.

The endless member 13 made of a metal belt is constituted by a plate-like element having a pair of left and right recesses and a plurality of metal rings. Each of the metal rings is obtained by welding end portions of a thin plate of maraging steel to form a tubular shape, subjecting it to a solution treatment and cutting it into a predetermined width, extending it by applying pressure to a predetermined circumferential length, and subjecting it to the solution treatment again.

In the continuously variable transmission 1, the widths of the pulley grooves 11a and 12a of the drive pulley 11 and the driven pulley 12 are changed by thrust due to a hydraulic pressure, a winding radius of the endless member 13 is changed, and thereby a transmission gear ratio (a rotation speed of the input shaft 9 (or the pulley shaft 23)/a rotation speed of the output shaft 14) is continuously changed.

The output shaft 14 is rotatably supported by the transmission case 22 by bearings. Referring to FIG. 1, an output gear 30 is provided in the output shaft 14, and the output shaft 14 and the output gear 30 rotate integrally.

A first intermediate gear 31 meshes with the output gear 30. The first intermediate gear 31 is fixed to an intermediate shaft 32 disposed parallel to the output shaft 14. Further, a second intermediate gear 33 is fixed to the intermediate shaft 32. External teeth 4a provided at the differential gear 4 mesh with the second intermediate gear 33.

A parking gear 41 is fixed to the output shaft 14 to rotate integrally. Also, a parking pawl 43 capable of meshing with the parking gear 41 is provided in the continuously variable transmission 1. A parking lock mechanism 40 according to the present embodiment is configured with the parking gear 41 and the parking pawl 43.

Further, the continuously variable transmission 1 includes a control device 34 including an electronic unit configured by a central processing unit (CPU), a memory, and the like. The control device 34 receives predetermined signals of vehicle information such as an operation signal of a brake pedal 6 (braking operation unit) by a driver, a traveling speed signal of the vehicle, or an acceleration signal of the acceleration sensor 7 (inclination angle detection unit), and based on the received signal, a control program of the continuously variable transmission 1 stored in the memory is executed by the CPU, thereby controlling operations of the drive pulley 11, the driven pulley 12, the forward clutch 20, and the reverse brake 21.

Figure 2:
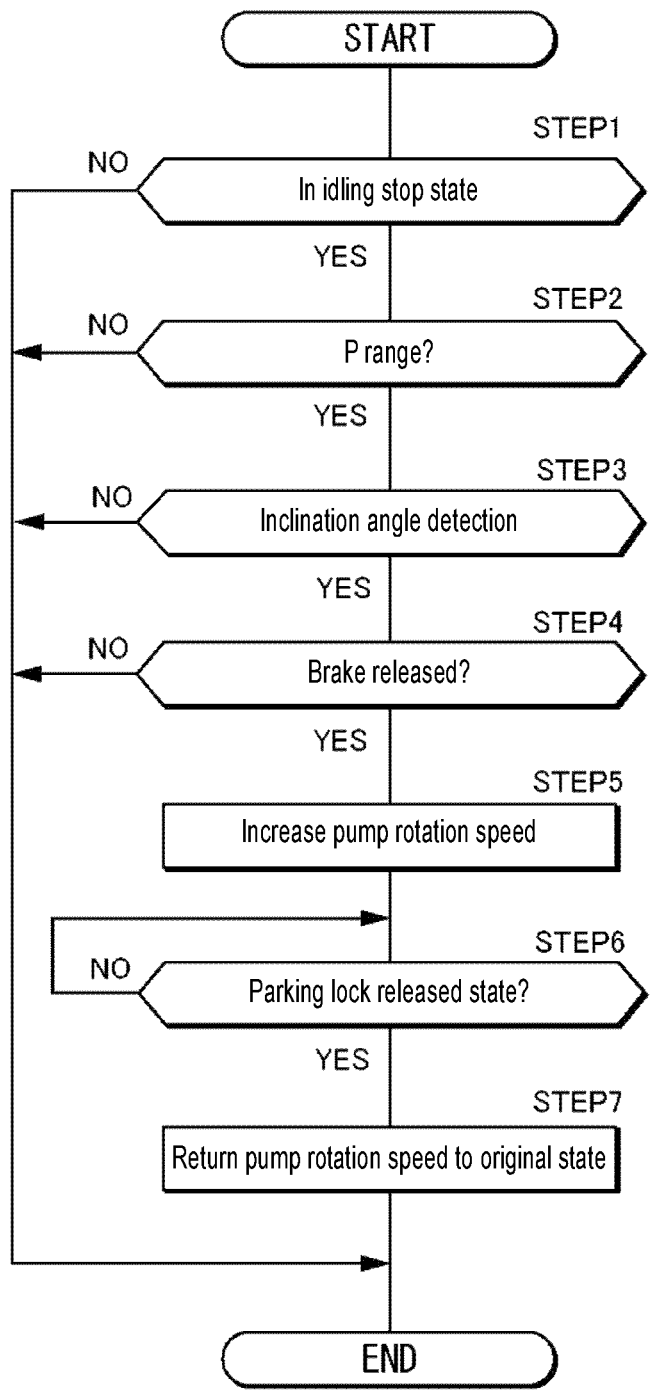
FIG. 2 is a flowchart showing an operation of the control device of the present embodiment.

FIG. 2 shows a flowchart showing an operation of the control device 34. First, in STEP 1, whether or not a vehicle is executing control of an idling stop is confirmed based on the received predetermined vehicle information. When the control of the idling stop is not being executed, current processing ends as it is. When the control of the idling stop is being executed, the operation proceeds to STEP 2 and confirms whether or not a shift position is in a parking range (P range) and the parking lock mechanism 40 is in a parking lock state. When the shift position is not in the P range, current process ends as it is. The parking lock state is a state in which the parking pawl 43 is meshed with the parking gear 41, and a parking lock released state is a state in which meshing between the parking gear 41 and the parking pawl 43 is released. The parking lock mechanism 40 is configured to be switchable between the parking lock state and the parking lock released state.

When the shift position is in the P range in STEP 2, the operation proceeds to STEP 3, in which an inclination angle (inclination information) of a road surface on which the vehicle is currently stopped, which is obtained on the basis of an acceleration signal received from the acceleration sensor 7 serving as the inclination angle detection unit, is received, and whether or not the received inclination angle (inclination information) is equal to or larger than a predetermined inclination angle, at which slipping of the endless member 13 may occur, is confirmed. The "predetermined inclination angle" is appropriately set by taking a weight of the vehicle or the like into account. When the received inclination angle is less than the predetermined inclination angle, current processing ends as it is.

In STEP 3, when the received inclination angle is equal to or larger than the predetermined inclination angle, the operation proceeds to STEP 4, and whether a braking operation, in which the brake pedal 6 is depressed by the driver, is not being performed is confirmed. When the brake pedal 6 is being depressed, drive wheels cannot be rotated and shaft torsion does not occur either, and thus current processing ends as it is.

When the braking operation is not being performed in STEP 4, the operation proceeds to STEP 5, in which a pump rotation speed increase control for increasing a rotation speed of the electric oil pump is executed. In this pump rotation speed increase control, an appropriate rotation speed of the electric oil pump is obtained from map data between inclination angles and pump rotation speeds stored in advance on the basis of the inclination angle detected in STEP 3, and the electric oil pump is driven at the obtained rotation speed. The rotation speed of the electric oil pump with respect to the inclination angle is set on the basis of a weight of the vehicle, a capacity of the electric oil pump mounted on the vehicle, or the like.

Next, the operation proceeds to STEP 6, in which whether or not the parking lock mechanism 40 has been switched to the parking lock released state, in which the parking lock is released by the driver switching the shift position or the like from the P range to a D range or the like, is confirmed. When the parking lock state has been maintained without being switched to the parking lock released state, processing of STEP 6 is repeated.

When the parking lock mechanism 40 has been switched to the parking lock released state in STEP 6, the operation proceeds to STEP 7, in which the electric oil pump is returned to its normal control processing state such as returning the rotation speed of the electric oil pump to an original state or stopping the rotation of the electric oil pump when a mechanical oil pump is operating in accordance with starting of an internal-combustion engine.

According to the control device and the control method of the present embodiment, the rotation speed increase control in STEP 5 of FIG. 2 is executed on a condition that the vehicle is in an idling stop state and the parking lock mechanism 40 is in the parking lock state. Therefore, even when the parking lock mechanism 40 is switched to the parking lock released state, the endless member is securely held by the lateral pressure of the drive pulley and the driven pulley, and thereby slipping of the endless member on the drive pulley and the driven pulley can be prevented.

Further, regardless of the inclination, when the rotation speed increase control is executed on the condition that the vehicle is in the idling stop state and the parking lock mechanism is in the parking lock state, although a configuration of control processing can be simplified, electric energy is wastefully consumed when the rotation speed increase control is executed under the condition that shaft torsion does not occur.

Therefore, in STEP 3 of FIG. 2, if the rotation speed increase control is executed when an inclination is equal to or larger than the predetermined inclination (YES in STEP 3) and if the rotation speed increase control is not executed when an inclination is less than the predetermined inclination (NO in STEP 3), wasteful consumption of electric energy when the inclination may not cause shaft torsion can be minimized. Further, the "predetermined inclination" is appropriately set as an inclination at which shaft torsion may occur to such an extent that slipping of the endless member may occur according to a weight of the vehicle or the like.

Further, the larger an inclination of a place at which the vehicle is stopped, the more a torsion amount of the shaft increases, and a hydraulic pressure required to prevent the endless member from slipping when the parking lock mechanism 40 is switched to the parking lock released state also increases. Therefore, when an increment of the rotation speed of the electric oil pump is set to correspond to the inclination angle, it is possible to appropriately prevent slipping of the endless member accompanying release of the shaft torsion while minimizing wasteful consumption of electric energy.

Further, when a braking operation of the vehicle is being performed, since drive wheels do not rotate, shaft torsion does not occur.

Therefore, when the rotation speed increase control is executed on a condition that the braking operation of the vehicle is not being performed and if execution of the rotation speed increase control is stopped when the braking operation of the vehicle is being performed, wasteful consumption of electric energy when the braking operation, in which shaft torsion may not occur, is performed can be minimized.

In the control device, the control method, and the vehicle of the present embodiment, it has been described that an inclination is detected in STEP 3, and whether or not a braking operation such as depression of the brake pedal is being performed is confirmed in STEP 4. However, in the control device and the control method of the embodiments of the disclosure, at least one of STEP 3 and STEP 4 may be omitted, and this also makes it possible to obtain the operation and effects of the embodiments of the disclosure in which the endless member can be appropriately prevented from slipping.

Further, in the continuously variable transmission of the present embodiment, description has been made using a continuously variable transmission including a mechanical oil pump that rotates utilizing a driving force of the internal-combustion engine, but the continuously variable transmission of the embodiments of the disclosure is not limited to thereto, and a continuously variable transmission including only an electric oil pump without a mechanical oil pump may also be used. This also makes it possible to obtain the operation and effects of the embodiments of the disclosure in which the endless member can be appropriately prevented from slipping.

Further, in the present embodiment, a configuration in which the rotation speed of the electric oil pump is variable according to the received inclination angle has been described. However, the control device and the control method of the embodiments of the disclosure are not limited thereto, and, for example, when an inclination angle equal to or larger than the predetermined angle is detected, it is also possible to obtain the operation and effects of the embodiments of the disclosure in which the endless member can be appropriately prevented from slipping even when the rotation speed of the electric oil pump is uniformly increased to a constant rotation speed.

Further, a way of obtaining the rotation speed according to the inclination angle is not limited to the map data, and a formula that has obtained a relationship between an inclination angle and a rotation speed may be stored and then the rotation speed of the electric oil pump may be arithmetically processed according to the inclination angle to obtain the rotation speed.

What is claimed is:

1. A control device of a continuously variable transmission comprising:
    a drive pulley;
    a driven pulley;
    an endless member wound around the drive pulley and the driven pulley;
    a parking lock mechanism including a parking gear integrally rotating with the driven pulley and configured to be switchable between a parking lock state in which rotation of the parking gear is stopped and a parking lock released state in which the parking gear is rotatable; and an electric oil pump which is able to supply a hydraulic pressure to the drive pulley and the driven pulley, wherein on a condition that a vehicle is in an idling stop state and the parking lock mechanism is in the parking lock state, even when the parking lock mechanism is switched to the parking lock released state, rotation speed increase control configured to increase a rotation speed of the electric oil pump is executed to be able to prevent the endless member from slipping with respect to the driven pulley.

2. The control device of a continuously variable transmission according to claim 1, wherein the control device is able to receive or calculate inclination information from an inclination detection unit, and increases an increment of the rotation speed of the electric oil pump as an inclination angle of the obtained inclination information becomes larger.

3. The control device of a continuously variable transmission according to claim 2, wherein the control device is able to receive or calculate inclination information from the inclination detection unit, and executes the rotation speed increase control when an inclination of the obtained inclination information is equal to or larger than a predetermined inclination.

4. The control device of a continuously variable transmission according to claim 1, wherein the control device is able to receive or calculate inclination information from the inclination detection unit, and executes the rotation speed increase control when an inclination of the obtained inclination information is equal to or larger than a predetermined inclination.

5. The control device of a continuously variable transmission according to claim 4, wherein the control device is able to receive presence/absence information of a braking operation of the vehicle, executes the rotation speed increase control on a condition that the braking operation of the vehicle is not being performed, and stops execution of the rotation speed increase control when the braking operation of the vehicle is being performed.

6. The control device of a continuously variable transmission according to claim 3, wherein the control device is able to receive presence/absence information of a braking operation of the vehicle, executes the rotation speed increase control on a condition that the braking operation of the vehicle is not being performed, and stops execution of the rotation speed increase control when the braking operation of the vehicle is being performed.

7. The control device of a continuously variable transmission according to claim 2, wherein the control device is able to receive presence/absence information of a braking operation of the vehicle, executes the rotation speed increase control on a condition that the braking operation of the vehicle is not being performed, and stops execution of the rotation speed increase control when the braking operation of the vehicle is being performed.

8. The control device of a continuously variable transmission according to claim 1, wherein the control device is able to receive presence/absence information of a braking operation of the vehicle, executes the rotation speed increase control on a condition that the braking operation of the vehicle is not being performed, and stops execution of the rotation speed increase control when the braking operation of the vehicle is being performed.

9. A continuously variable transmission comprising:
the control device according to claim 8;
the drive pulley;
the driven pulley;
the endless member;
the parking lock mechanism; and
the electric oil pump.

10. A continuously variable transmission comprising:
the control device according to claim 7;
the drive pulley;
the driven pulley;
the endless member;
the parking lock mechanism; and
the electric oil pump.

11. A continuously variable transmission comprising:
the control device according to claim 6;
the drive pulley;
the driven pulley;
the endless member;
the parking lock mechanism; and
the electric oil pump.

12. A continuously variable transmission comprising:
the control device according to claim 5;
the drive pulley;
the driven pulley;
the endless member;
the parking lock mechanism; and
the electric oil pump.

13. A continuously variable transmission comprising:
the control device according to claim 4;
the drive pulley;
the driven pulley;
the endless member;
the parking lock mechanism; and
the electric oil pump.

14. A continuously variable transmission comprising:
the control device according to claim 3;
the drive pulley;
the driven pulley;
the endless member;
the parking lock mechanism; and
the electric oil pump.

15. A continuously variable transmission comprising:
the control device according to claim 2;
the drive pulley;
the driven pulley;
the endless member;
the parking lock mechanism; and
the electric oil pump.

16. A continuously variable transmission comprising:
the control device according to claim 1;
the drive pulley;
the driven pulley;
the endless member;
the parking lock mechanism; and
the electric oil pump.

17. A vehicle comprising:
the continuously variable transmission according to claim 16;
a motor which outputs a driving force to the continuously variable transmission;
an inclination detection unit which transmits information to the control device; and
a drive wheel rotated by a driving force output from the continuously variable transmission.

18. A vehicle comprising:
the continuously variable transmission according to claim 15;
a motor which outputs a driving force to the continuously variable transmission;
an inclination detection unit which transmits information to the control device; and
a drive wheel rotated by a driving force output from the continuously variable transmission.

19. A vehicle comprising:
the continuously variable transmission according to claim 14;
a motor which outputs a driving force to the continuously variable transmission;
an inclination detection unit which transmits information to the control device; and
a drive wheel rotated by a driving force output from the continuously variable transmission.

20. A control method of a continuously variable transmission comprising:
a drive pulley;
a driven pulley;
an endless member wound around the drive pulley and the driven pulley;
a parking lock mechanism including a parking gear integrally rotating with the driven pulley and configured to be switchable between a parking lock state in which rotation of the parking gear is stopped and a parking lock released state in which the parking gear is rotatable; and
an electric oil pump which is able to supply a hydraulic pressure to the drive pulley and the driven pulley, wherein
on a condition that a vehicle is in an idling stop state and the parking lock mechanism is in the parking lock state, even when the parking lock mechanism is switched to the parking lock released state, rotation speed increase control configured to increase a rotation speed of the electric oil pump is executed to be able to prevent the endless member from slipping with respect to the driven pulley.

* * * * *